US012091547B2

(12) United States Patent
Winkler et al.

(10) Patent No.: US 12,091,547 B2
(45) Date of Patent: Sep. 17, 2024

(54) SILICONE ELASTOMER COMPOSITION

(71) Applicant: tesa SE, Norderstedt (DE)

(72) Inventors: Tobias Winkler, Hamburg (DE); Christof-Gottfried Hoelger, Weil am Rhein (DE); Paraskevi Christogianni, London (GB); Thomas Dowden, London (GB); Priti Ariscrisna, London (GB); Elliot Allen, London (GB); Mark Buckingham, Cambridge (GB); Reya Shamsah, Edgware (GB); Anna Blades, Surrey (GB); Alice Dowden, London (GB); Khai Duong Quang Nguyen, London (GB); Julien Gautrot, Cambridge (GB)

(73) Assignee: tesa SE, Norderstedt (DE)

( * ) Notice: Subject to any disclaimer, the term of this patent is extended or adjusted under 35 U.S.C. 154(b) by 179 days.

(21) Appl. No.: 17/531,385

(22) Filed: Nov. 19, 2021

(65) Prior Publication Data
US 2022/0162448 A1 May 26, 2022

(30) Foreign Application Priority Data
Nov. 20, 2020 (EP) .................... 20209076

(51) Int. Cl.
C08L 83/04 (2006.01)
C08G 77/08 (2006.01)
(Continued)

(52) U.S. Cl.
CPC .............. C08L 83/04 (2013.01); C08G 77/08 (2013.01); C08G 77/20 (2013.01); C08K 3/26 (2013.01);
(Continued)

(58) Field of Classification Search
CPC ......... C08L 83/04; C08G 77/08; C08G 77/20; C08K 3/26; C08K 3/36; C08K 5/5419;
(Continued)

(56) References Cited

U.S. PATENT DOCUMENTS

2011/0166280 A1* 7/2011 Davio .................... C08L 83/04
524/447
2020/0148830 A1* 5/2020 Dowden ................ C08L 83/04
2020/0157349 A1 5/2020 Ariscrisna et al.

FOREIGN PATENT DOCUMENTS

WO 2008065406 A1 6/2008
WO 2018109425 A1 6/2018
WO 2018109493 A1 6/2018

OTHER PUBLICATIONS

Gun'ko, V.M., et al., "Morphology and surface properties of fumed silicas," Journal of Colloid and Interface Science, 2005, 427-445, 289, Elsevier Inc.

* cited by examiner

Primary Examiner — Robert S Jones, Jr.
Assistant Examiner — Jiangtian Xu
(74) Attorney, Agent, or Firm — Price Heneveld LLP

(57) ABSTRACT

The present invention provides a tin-free, room temperature curable silicone elastomer composition, wherein the uncured composition is a putty. The silicone elastomer composition comprises a) an end-capped base polymer, wherein the base polymer comprises a polysiloxane or mixture of polysiloxanes, and wherein the end-capped base polymer comprises terminal di-$(C_{1-4})$alkoxy silyl groups; b) at least one amorphous filler; c) 15.1 to 60 parts by weight of at least one spherical filler for each 100 parts by weight of base polymer; and d) a curing catalyst consisting of one or more selected from the group consisting of organic titanates and organic zirconates. The terminal dialkoxy silyl groups of the base
(Continued)

polymer can be dimethoxy silyl groups. The at least one amorphous filler can be selected from the group consisting of fumed silica, fumed alumina, carbon black, precipitated silica, precipitated calcium carbonate, surface-treated calcium carbonate and mixtures thereof.

20 Claims, 1 Drawing Sheet

(51) Int. Cl.
    *C08G 77/20*     (2006.01)
    *C08K 3/26*     (2006.01)
    *C08K 3/36*     (2006.01)
    *C08K 5/5419*     (2006.01)
    *C08K 7/10*     (2006.01)
    *C08K 7/20*     (2006.01)
    *C08K 9/06*     (2006.01)

(52) U.S. Cl.
    CPC .............. *C08K 3/36* (2013.01); *C08K 5/5419* (2013.01); *C08K 7/10* (2013.01); *C08K 7/20* (2013.01); *C08K 9/06* (2013.01); *C08K 2003/265* (2013.01)

(58) Field of Classification Search
    CPC ... C08K 7/10; C08K 7/20; C08K 9/06; C08K 2003/265
    See application file for complete search history.

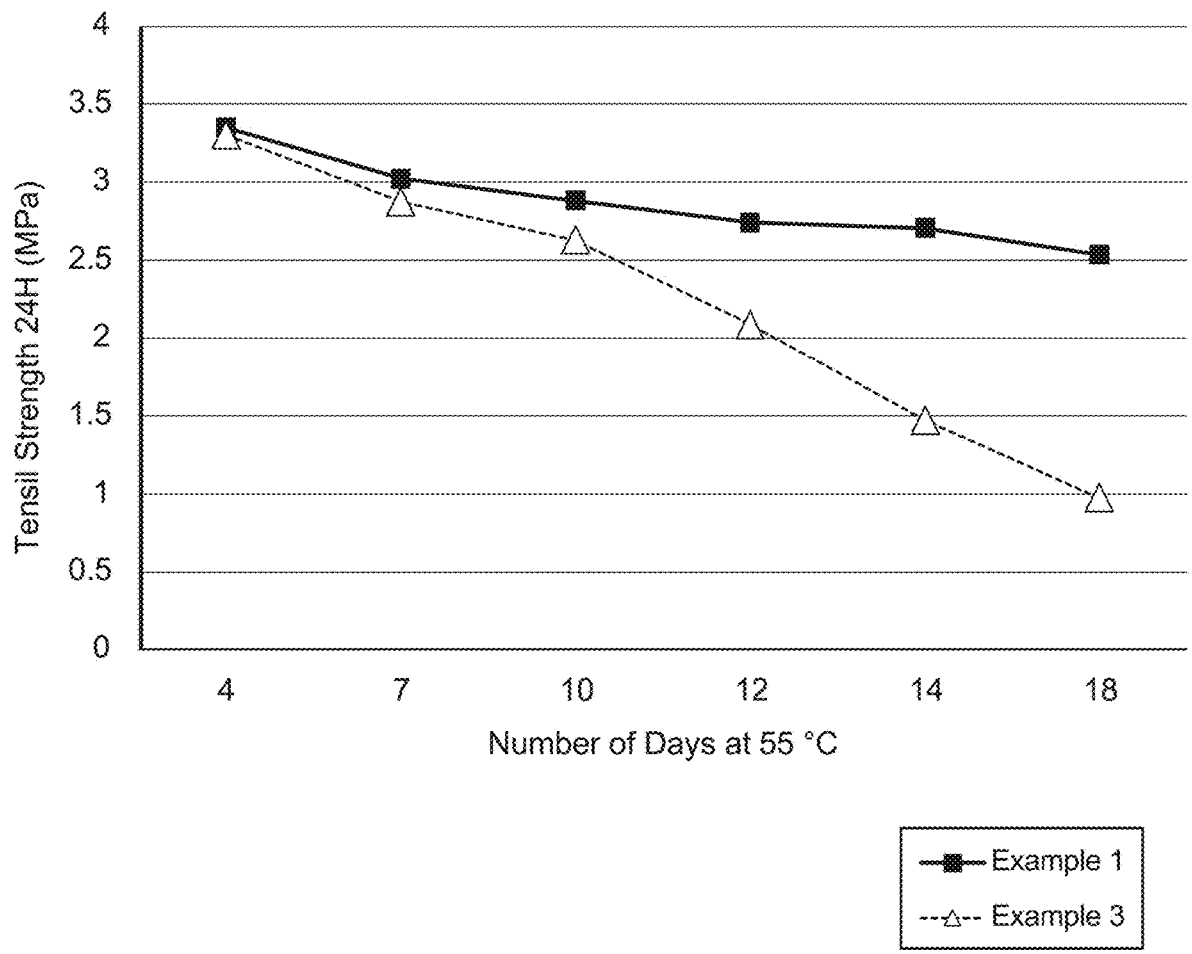

SILICONE ELASTOMER COMPOSITION

CROSS-REFERENCE TO RELATED APPLICATION

This application claims foreign priority benefits under 35 U.S.C. § 119(a)-(d) to European Patent Application 20209076.7 filed 20 Nov. 2020, which is hereby incorporated by reference in its entirety.

FIELD OF THE INVENTION

The present invention relates to a tin-free, room temperature curable silicone elastomer composition. The putty-like uncured composition can be moulded into complex shapes and maintains its shape during cure. The silicone elastomer composition of the present invention is useful for a variety of purposes, from forming new objects to customising, repairing or otherwise modifying existing objects.

BACKGROUND

Silicone elastomer compositions that are putty-like in their uncured state and have adhesive properties are known in the art, for example from WO 2008/065406 A1. The putty-like characteristics of the uncured compositions allow them to be moulded to any desired shape, particularly by hand, and to retain that desired shape as they cure at room temperature by simple exposure to moisture in the air. This combination of properties provides an extremely versatile material that has found use in a wide range of applications.

Silicone elastomer compositions of the condensation curing type generally rely on a tin-based curing catalyst, particularly in the case of room temperature curable compositions. The known compositions of WO 2008/065406 A1 rely on such a tin-based curing catalyst.

While tin-based curing catalysts are very effective and provide compositions suitable for use in many applications, the use of organotin compounds is restricted in certain applications. For example, EU Directive 2009/48/EC on the safety of toys and the associated European Standard EN 71-3:2013+A1:2014 include such restrictions. Organotin compounds have also been associated with environmental concerns, particularly in relation to the marine environment. Accordingly, attempts were made to address these problems. Related tin-free compositions are disclosed in WO 2018/109425 A1 and WO 2018/109493 A1, both compositions being based on end-capped polysiloxane base polymers, specific combinations of fillers and organic titanates or zirconates as catalysts. While these compositions have good storage characteristics, particularly in terms of plasticity, they have been found to exhibit non-satisfying curing properties under some conditions, e.g. low curing speed and low cure depth.

In view of the above, there is a need for a room temperature curable silicone elastomer composition that has adhesive properties, is putty-like in its uncured state, is tin-free and is improved with respect to its curing properties and shelf life.

SUMMARY OF THE INVENTION

According to a first aspect, the present invention provides a tin-free, room temperature curable silicone elastomer composition, wherein the uncured composition is a putty and comprises the following components:

a) an end-capped base polymer, wherein the base polymer comprises a polysiloxane or mixture of polysiloxanes, and wherein the end-capped base polymer comprises terminal di-($C_{1-4}$)alkoxy silyl groups;
b) at least one amorphous filler;
c) 15.1 to 60 parts by weight of at least one spherical filler for each 100 parts by weight of base polymer; and
d) a curing catalyst consisting of one or more selected from the group consisting of organic titanates and organic zirconates.

The Williams plasticity number of the uncured composition may be from 100 to 350 at 25° C., for example from 120 to 300 at 25° C., for example from 150 to 260 at 25° C., for example from 160 to 250 at 25° C. or from 170 to 240 at 25° C.

The composition is advantageously a one-part silicone elastomer composition.

The base polymer may comprise one type or more than one type of monomer of the following general formula:

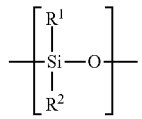

wherein $R^1$ and $R^2$ are independently selected from the group consisting of linear or branched ($C_{1-6}$)alkyl groups, linear or branched ($C_{2-6}$)alkenyl groups, linear or branched ($C_{2-4}$)haloalkyl groups and phenyl groups. For example, $R^1$ and $R^2$ may be independently selected from the group consisting of linear or branched ($C_{1-6}$)alkyl groups and ($C_{2-3}$)alkylene-trihalomethyl groups; for example independently selected from the group consisting of linear or branched ($C_{1-2}$)alkyl groups, ($C_{2-3}$)alkylene-trifluoromethyl groups, and ($C_{2-3}$)alkylene-trichloromethyl groups; for example independently selected from the group consisting of a methyl group, an ethyl group, a 3,3,3-trifluoropropyl group and a 4,4,4-trifluorobutyl group.

Both $R^1$ and $R^2$ may be methyl groups. In particular, at least 75% of the $R^1$ and $R^2$ groups of the base polymer may be methyl groups; at least 90% of the $R^1$ and $R^2$ groups of the base polymer may be methyl groups; or all of the $R^1$ and $R^2$ groups of the base polymer may be methyl groups.

The base polymer may comprise a hydroxy-terminated polysiloxane or mixture of hydroxy-terminated polysiloxanes. The hydroxy-terminated polysiloxane, or each hydroxy-terminated polysiloxane in the mixture of hydroxy-terminated polysiloxanes, may have the following general formula:

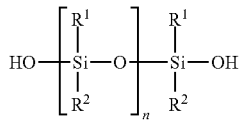

wherein n is selected such that the hydroxy-terminated polysiloxane or mixture of hydroxy-terminated polysiloxanes has a viscosity of at least 80,000 mPa·s, preferably of at least 150,000 mPa·s at 25° C.

The base polymer may comprise a hydroxy-terminated polydimethylsiloxane (PDMS) or mixture of hydroxy-terminated polydimethylsiloxanes.

The viscosity of the base polymer may be from 80,000 to 1,000,000 mPa·s at 25° C., for example from 110,000 to 700,000 mPa·s at 25° C., from 120,000 to 600,000 mPa·s at 25° C., from 130,000 to 500,000 mPa·s at 25° C., from 140,000 to 400,000 mPa·s at 25° C. or from 145,000 to 320,000 mPa·s at 25° C.

The terminal di-$(C_{1-4})$alkoxy silyl groups may have the general formula:

$$-SiR^a(OR^b)(OR^c)$$

wherein $R^a$ is selected from the group consisting of a linear or branched $(C_{1-10})$alkyl group, a linear or branched $(C_{2-8})$ alkenyl group and a $(C_{6-10})$aryl group, each of which groups may be optionally substituted by one or more substituents selected from the group consisting of halogens, a cyano group, an aminyl group, an —NHR$^e$, group, an —NR$^e$R$^f$ group, an —OR$^e$ group, a —C(=O)R$^e$ group, a —C(=O)OR$^e$ group, a carboxyl group, a glycidyl group and a sulfanyl group, wherein each R$^e$ and R$^f$ group is independently selected from the group consisting of linear or branched $(C_{1-6})$alkyl groups; and R$^b$ and R$^c$ are independently selected from the group consisting of $(C_{2-4})$alkyl groups.

$R^a$ may, for example, be selected from the group consisting of a linear or branched $(C_{1-6})$alkyl group and a linear or branched $(C_{2-6})$alkenyl group, for example from the group consisting of a $(C_{1-2})$alkyl group or a $(C_{2-3})$alkenyl group, for example from the group consisting of a methyl group and a vinyl group.

$R^b$ and $R^c$ may, for example, be independently selected from the group consisting of methyl, ethyl, n-propyl and iso-propyl groups. For example, $R^b$ and $R^c$ may be methyl groups. Preferably, the terminal dialkoxy silyl groups of the base polymer are dimethoxy silyl groups.

The end-capped base polymer may be the reaction product of a hydroxy-terminated polysiloxane or mixture of hydroxy-terminated polysiloxanes and an end-capping reagent comprising a tri-$(C_{1-4})$alkoxy silane. The tri-$(C_{1-4})$ alkoxy silane may have the general formula:

$$SiR^a(OR^b)(OR^c)(OR^d)$$

wherein $R^a$, $R^b$ and $R^c$ are as defined above; and $R^d$ is a $(C_{1-4})$alkyl group. For example, $R^d$ may be selected from the group consisting of methyl, ethyl, n-propyl and iso-propyl groups. For example, $R^d$ may be a methyl group.

The tri-$(C_{1-4})$alkoxy silane may, for example, be selected from the group consisting of trimethoxyvinylsilane, trimethoxymethyl silane, and mixtures thereof.

The organic titanates and organic zirconates may be represented by the following general formula:

$$M(OR)_a(C)_{4-a}$$

wherein M is Ti or Zr; each R may be the same or different and represents a linear or branched $(C_{1-12})$alkyl group; each C may be the same or different and represents a ligand having the following general formula:

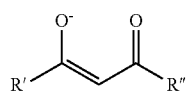

wherein R' and R" are independently selected from the group consisting of a linear or branched $(C_{1-6})$alkyl group and a linear or branched $(C_{1-6})$alkoxy group; and a is an integer from 0 to 4.

M may, for example, be Ti. Each R may, for example, be the same or different and represents a linear or branched $(C_{3-10})$alkyl group, for example a linear or branched $(C_{3-8})$ alkyl group, for example an isobutyl, isopropyl or 2-ethyl hexyl group. R' and R" may, for example, be independently selected from the group consisting of a linear or branched $(C_{1-3})$alkyl group and a linear or branched $(C_{1-3})$alkoxy group, for example from the group consisting of a methyl group, an ethyl group, a methoxy group and an ethoxy group, for example from the group consisting of a methyl group and an ethoxy group. For example, R' may be a linear or branched $(C_{1-3})$alkyl group and R" may be a linear or branched $(C_{1-3})$alkoxy group. For example, R' may be a methyl or ethyl group and R" may be a methoxy or ethoxy group.

a may be 0, 2 or 4. For example, a may be 2.

The curing catalyst may consists of one or more selected from the group consisting of diisobutoxy-bis(ethylacetoacetato)titanate, titanium diisobutoxide bis(acetylacetonate), titanium diisopropoxide bis(acetylacetonate), titanium diisopropoxide bis(ethylacetoacetate) and zirconium dibutoxide bis(acetylacetonate).

An amorphous filler is understood to be a particulate filler where the particles are irregularly shaped, i.e. they do not have a common type of shape. The at least one amorphous filler may have a B.E.T. surface area of at least 60 m$^2$/g, for example from 60 m$^2$/g to 450 m$^2$/g, for example from 80 m$^2$/g to 150 m$^2$/g.

The at least amorphous filler may be selected from the group consisting of fumed silica, fumed alumina, carbon black, precipitated silica, calcium carbonate, titanium dioxide and mixtures thereof. For example, the at least one amorphous filler may be a silica or calcium carbonate; preferably, the at least one amorphous filler is selected from the group consisting of fumed silica, precipitated silica and precipitated calcium carbonate; and most preferably, the at least one amorphous filler is fumed silica, for example hydrophobic fumed silica.

The at least one amorphous filler may be present in an amount of from 5% to 40% by weight, preferably from 8% to 30% by weight, for example from 10% to 25% by weight or from 11% to 20% by weight, based on the total weight of the composition. In relation to the base polymer, the at least one amorphous filler may be present in an amount of from 20 to 55 parts by weight for each 100 parts by weight of base polymer, preferably from 25 to 50 parts by weight for each 100 parts by weight of base polymer, for example from 30 to 45 parts by weight for each 100 parts by weight of base polymer.

The at least one spherical filler may be selected from the group consisting of calcium silicate, titanium dioxide, silicone elastomer powder, glass bubbles, polymeric bubbles and ceramic bubbles. For example, the at least one spherical filler may be glass bubbles, preferably hollow glass bubbles.

The at least one spherical filler may have an average particle size (D50) in the range of from 30 to 50 μm; and/or may have a mean true density in the range of from 0.15 to 0.35 g/cm$^3$.

The at least one spherical filler may preferably be present in an amount of from 15.5 to 56 parts by weight for each 100 parts by weight of base polymer, for example from 20 to 45 parts by weight for each 100 parts by weight of base polymer. In relation to the whole composition, the at least one spherical filler may preferably be present in an amount of from 5% to 25% by weight, preferably of from 8% to 20% by weight, based on the total weight of the composition.

The composition according to the invention may comprise further fillers. For example, the composition may comprise at least one further particulate filler which may have an average particle size (D50) of at least 5 μm, for example from 5 μm to 35 μm. The B.E.T. surface area of the at least one further particulate filler may be less than 40 m²/g.

In the context of the present invention, it will be self-evident that the further particulate filler is neither an amorphous filler nor a spherical filler even if fillers being identical in their chemical nature may be found among the further particulate fillers and one or both of the other groups as well.

The at least one further particulate filler—which may alternatively be referred to as "non-reinforcing filler"—may be selected from the group consisting of talc, acid-treated calcium carbonate, calcium silicate, mica, precipitated silica, further inorganic mineral fillers like aluminium borate; Nylon materials and mixtures thereof. For example, the at least one further particulate filler may comprise one or more grades of talc, for example one or more grades of talc selected from the group consisting of talc grades having an average particle size (D50) in the range of from 5 to 35 μm.

In an embodiment, the composition according to the invention further comprises at least one particulate filler having a needle-like, rod-like or cylinder shape. The at least one particulate filler having a needle-like, rod-like or cylinder shape may have an average particle length (L50) of at least 5 μm, for example from 5 μm to 90 μm or from 10 μm to 30 μm.

The at least one particulate filler having a needle-like, rod-like or cylinder shape may be selected from the group consisting of wollastonite needles, aluminium borate needles, aluminium borate whiskers, potassium hexatitanate whiskers, carbon fibers (short chopped), carbon nanotubes and graphitic carbon nanofibers.

Preferably, the composition according to the invention comprises at least one particulate filler having a needle-like structure. The at least one filler having a needle-like structure may have a mean aspect ratio of at least 3, for example from 3 to 30 or from 3 to 20.

The at least one filler having a needle-like structure may be an inorganic mineral filler and may be selected, for example, from wollastonite, aluminium borate, and mixtures thereof. For example, the at least one filler having a needle-like structure may comprise wollastonite.

The at least one filler having a needle-like structure may be present in an amount of from 5% to 30% by weight based on the total weight of the composition, for example from 10% to 25% by weight based on the total weight of the composition.

The composition may further comprise at least one fibrous filler. The at least one fibrous filler may be composed of threads or filaments having an average aspect ratio of greater than 10 and an average length of less than 1 mm. For example, the average length of the threads or filaments may be from 75 μm to 500 μm.

The at least one fibrous filler may be selected from the group consisting of natural and synthetic organic polymers. For example, the at least one fibrous filler may comprise chopped fibers of one or more selected from the group consisting of natural and synthetic organic polymers; preferably, it may comprise Nylon materials.

The composition may comprise up to 15 parts, for example up to 13 parts or up to 11 parts, by weight of the at least one fibrous filler for each 100 parts by weight of base polymer.

The composition may additionally comprise an adhesion promoter, for example up to 2 parts by weight of adhesion promoter for each 100 parts by weight of base polymer. The adhesion promoter may, for example, be one or more selected from the group of compounds having the following general formula:

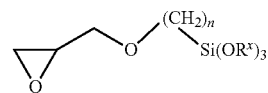

wherein n is an integer from 2 to 10; and $R^x$ is a linear or branched $(C_{1-6})$alkyl group. For example, n may be 3 or 8 and $R^x$ may be an ethyl group.

The composition may further comprise at least one stabilizer. The at least one stabilizer may be a tri-$(C_{2-4})$alkoxy silane as defined above with reference to the end-capping reagent. The composition may comprise from 1.5 to 3.5 parts by weight of the at least one stabilizer for each 100 parts by weight of base polymer.

The composition may further comprise one or more additives selected from the group consisting of colorants, fragrances, anti-microbial agents, anti-bacterial agents and anti-fungal agents.

Preferably, no carboxylic acid or carboxylic acid anhydride is added to the composition.

According to a further aspect, the present invention provides a silicone elastomer composition comprising the composition described above in its cured state.

BRIEF DESCRIPTION OF THE DRAWINGS

In the drawings:
FIG. 1 shows the results of a shelf life test by measuring tensile strength of two samples based on Examples 1 and 3 after storage in air-tight packaging for 4, 7, 10, 12, 14 and 18 days at 55° C.

DETAILED DESCRIPTION OF THE PREFERRED EMBODIMENTS

According to a first aspect, the present invention provides a tin-free, room temperature curable silicone elastomer composition, wherein the uncured composition is a putty and comprises the following components:
a) an end-capped base polymer, wherein the base polymer comprises a polysiloxane or mixture of polysiloxanes, and wherein the end-capped base polymer comprises terminal di-$(C_{1-4})$alkoxy silyl groups;
b) at least one amorphous filler;
c) 15.1 to 60 parts by weight of at least one spherical filler for each 100 parts by weight of base polymer; and
d) a curing catalyst consisting of one or more selected from the group consisting of organic titanates and organic zirconates.

Unless otherwise stated herein, all physical characteristics refer to characteristics under ambient conditions, for example at 25° C. and atmospheric pressure.

The composition of the present invention offers a number of advantages compared to known room temperature curable silicone elastomer compositions that are putty-like in their uncured state. In particular, the composition of the present invention does not contain any tin, has improved curing characteristics, particularly in terms of curing speed and cure depth, and has improved shelf life.

The composition of the present invention is tin-free. In other words, the composition does not contain any tin in any form. In particular, the composition does not contain any tin-based catalysts. More particularly, the composition does not contain any organic tin compounds.

The provision of a tin-free composition has a number of advantages. One advantage is that tin-free compositions are preferable from a regulatory perspective, particularly for certain applications (see, for example, EU Directive 2009/48/EC on the safety of toys and the associated European Standard EN 71-3:2013+A1:2014). A further advantage is that the absence of tin, particularly organic tin compounds, may provide benefits from an environmental perspective.

The composition of the present invention is room temperature curable. This means that the composition is able to be cured in air under ambient conditions, for example at a temperature of 25° C.

The composition of the present invention is of the moisture-curing type (condensation curing). This means that moisture is required in order for the composition to cure. The moisture required for cure is typically provided by the moisture naturally present in the air.

The composition of the present invention is a putty in its uncured state, i.e. it has putty-like physical characteristics. The putty-like characteristics of the uncured composition may be characterized by its Williams plasticity Number.

Williams plasticity is a well-known methodology for characterizing the plasticity of putty-like materials. A method for determining Williams plasticity is set out in the Examples.

The Williams plasticity of the uncured composition may advantageously be in the range of from 150 to 350 at 25° C. For example, the Williams plasticity of the uncured composition may be 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345 or 350 at 25° C., as well as all intermediate values. Preferred Williams plasticity ranges for the uncured composition include 100 to 300 at 25° C., 150 to 280 at 25° C., 155 to 270 at 25° C., 160 to 260 at 25° C., 165 to 250 at 25° C. and 170 to 240 at 25° C.

The putty-like characteristics of the uncured composition of the present invention allow the uncured composition to be moulded into any desired shape, for example by hand; i.e. the uncured composition of the present invention is preferably hand-mouldable.

The uncured composition of the present invention is advantageously "low tack", particularly with respect to human skin. As such, when the uncured composition of the present invention is being moulded by hand, the composition does not stick to the skin to any significant extent and does not leave any significant residue. This provides for a pleasant and convenient user experience. In particular, the low tack characteristics of the composition enable it to be readily formed into precise shapes with smooth surfaces, for example by hand.

In addition to being readily mouldable, particularly hand-mouldable, an advantage of the uncured composition of the present invention is that it retains its shape once moulded and during subsequent cure, i.e. the uncured composition has excellent green strength (i.e. is self-supporting).

Curable silicone elastomer compositions are very common in the sealant and filler industries. In this regard, it should be noted that the physical characteristics and requirements of silicone sealants and fillers are very different to the physical characteristics and requirements of the compositions of the present invention. In particular, silicone sealants and fillers are designed to flow and fill gaps, while a putty-like composition is designed to maintain the shape into which it has been moulded. Thus, typically, silicone sealant and filler compositions are required to be easily extrudable in their uncured state (for example from a sealant gun), i.e. they are not putty-like and, to the extent that it can even be measured, they have very low plasticity; they are not low-tack, are not intended to be touched by hand, and leave significant residue on the skin if touched by hand; they cannot be moulded into complex shapes; and they have comparatively low green strength (i.e. are not self-supporting, particularly in the case of complex shapes and areas of overhang).

The composition of the present invention is preferably a one-part composition. This means that all components of the composition are pre-mixed during production, so that the composition is ready for use by an end user. However, it is conceivable that the composition of the present invention could also be supplied in two parts, if required.

The composition according to the present invention comprises an end-capped base polymer. The base polymer comprises a polysiloxane or mixture of polysiloxanes and has a viscosity of at least 80,000 mPa·s at 25° C. The end-capped base polymer comprises terminal di-$(C_{1-4})$ alkoxy silyl groups.

The base polymer preferably comprises a polyorganosiloxane or mixture of polyorganosiloxanes. Preferably, the base polymer comprises one type or more than one type of monomer of the following general formula:

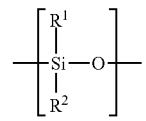

wherein $R^1$ and $R^2$ are independently selected from the group consisting of linear or branched $(C_{1-6})$alkyl groups, linear or branched $(C_{2-6})$alkenyl groups, linear or branched $(C_{2-4})$haloalkyl groups and phenyl groups.

In the case of a mixture of polysiloxanes, it is preferred that each polysiloxane in the mixture comprises one type or more than one type of monomer as defined above and as further defined below.

It is preferred that at least 75% of the monomers present in the base polymer are monomers as defined above and as further defined below, for example at least 80%, at least 85%, at least 90%, or at least 95%. Advantageously, substantially all of the monomers present in the base polymer are monomers as defined above and as further defined below.

Preferred groups for $R^1$ and $R^2$ are independently selected from the group consisting of linear or branched $(C_{1-6})$alkyl groups and $(C_{2-3})$alkylene-trihalomethyl groups (i.e. $(CH_2)_{2-3}CX_3$ groups, wherein X is a halogen; preferably, each X is independently selected from the group consisting of fluoro and chloro). Further preferred groups for $R^1$ and $R^2$ are independently selected from the group consisting of linear or branched $(C_{1-2})$alkyl groups, $(C_{2-3})$alkylene-trifluoromethyl groups, and $(C_{2-3})$alkylene-trichloromethyl groups. In particular, $R^1$ and $R^2$ may be independently selected from the group consisting of a methyl group, an ethyl group, a 3,3,3-trifluoropropyl group and a 4,4,4-trifluorobutyl group.

Particularly preferred base polymers of the present invention comprise monomers in which both $R^1$ and $R^2$ are methyl groups. For example, at least 75% of the monomers present in the base polymer can be monomers in which both $R^1$ and $R^2$ are methyl groups, for example at least 80%, at least 85%, at least 90%, or at least 95%. Advantageously, substantially all of the monomers present in the base polymer are monomers in which both $R^1$ and $R^2$ are methyl groups.

In the case where substantially all of the monomer units present in the base polymer are monomers in which both $R^1$ and $R^2$ are methyl group, the base polymer is a polydimethylsiloxane (PDMS) or mixture of polydimethylsiloxanes. Polydimethylsiloxanes are a very practical choice for use in the present invention, due not only to their advantageous properties, but also on account of their low cost and wide availability.

It is preferred that the polysiloxane of the base polymer or mixture of polysiloxanes of the base polymer are substantially linear.

The base polymer may comprise a hydroxy-terminated polysiloxane (i.e. an α, ω-hydroxy polysiloxane) or mixture of hydroxy-terminated polysiloxanes. The terminal group of such hydroxy-terminated polysiloxanes may have the following general formula:

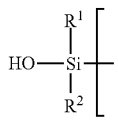

wherein $R^1$ and $R^2$ are as defined above.

Where the base polymer comprises a hydroxy-terminated polysiloxane or mixture of hydroxy-terminated polysiloxanes in which all of the monomer units present in the base polymer are monomer units of the type described above, then the hydroxy-terminated polysiloxane or each hydroxy-terminated polysiloxane in a mixture of hydroxy-terminated polysiloxanes may have the following general formula:

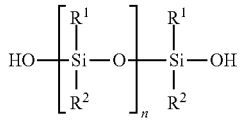

wherein n is selected such that the hydroxy-terminated polysiloxane or mixture of hydroxy-terminated polysiloxanes has a viscosity of at least 80,000 mPa·s at 25° C. The average value of n may be, for example, from at least 1550.

The average value of n may be, for example, at least 1550, at least 1580, at least 1600, at least 1615, at least 1635, at least 1650, at least 1670, at least 1685, at least 1700, at least 1715, at least 1730, at least 1740, at least 1755, at least 1765, at least 1780, at least 1790, at least 1800, at least 1815, at least 1825, at least 1835, or at least 1845.

The average value of n may be, for example, up to 2235, up to 2190, up to 2145, up to 2095, up to 2070, up to 2040, up to 2035, up to 2025, up to 2020, up to 2015, up to 2005, up to 2000, up to 1995, up to 1985, up to 1980, or up to 1970.

The average value of n may be, for example, from 1550 to 2235, from 1550 to 2095, from 1730 to 2040, from 1790 to 2005, or from 1845 to 1970.

A preferred base polymer according to the present invention comprises a hydroxy-terminated polydimethylsiloxane (PDMS) or mixture of hydroxy-terminated polydimethylsiloxanes.

The viscosity of the base polymer is at least 80,000 mPa·s at 25° C., for example at least 90,000 mPa·s, at least 100,000 mPa·s, at least 110,000 mPa·s, at least 120,000 mPa·s, at least 130,000 mPa·s, at least 135,000, at least 140,000, at least 150,000, at least 160,000, at least 180,000, at least 200,000, at least 220,000, at least 230,000, at least 240,000, at least 250,000, at least 260,000, at least 270,000, at least 280,000, at least 290,000, at least 300,000, at least 310,000, at least 320,000, at least 330,000, at least 340,000 or at least 350,000 mPa·s at 25° C.

The viscosity of the base polymer is preferably not more than 1,000,000 mPa·s at 25° C., for example not more than 900,000, not more than 800,000, not more than 700,000, not more than 650,000, not more than 600,000, not more than 590,000, not more than 580,000, not more than 570,000, not more than 560,000, not more than 550,000, not more than 540,000, not more than 530,000, not more than 520,000, not more than 510,000, or not more than 500,000 mPa·s at 25° C.

The viscosity of the base polymer is preferably from 100,000 to 400,000 mPa·s at 25° C., for example from 110,000 to 380,000, from 120,000 to 360,000, from 130,000 to 340,000, from 140,000 to 320,000 or from 150,000 to 300,000 mPa·s at 25° C., including all intermediate values.

The end-capped base polymer of the present invention comprises terminal di-$(C_{1-4})$alkoxy silyl groups. The terminal di-$(C_{1-4})$alkoxy silyl groups may have the following general formula:

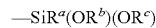

wherein:

$R^a$ is selected from the group consisting of a linear or branched $(C_{1-10})$alkyl group, a linear or branched $(C_{2-8})$alkenyl group and a $(C_{6-10})$aryl group, each of which groups may be optionally substituted by one or more substituents selected from the group consisting of halogens (for example, fluoro and/or chloro, particularly fluoro), a cyano group, an aminyl group, an —$NHR^e$, group, an —$NR^eR^f$ group, an —$OR^e$ group, a —$C(=O)R^e$ group, a —$C(=O)OR^e$ group, a carboxyl group, a glycidyl group and a sulfanyl group, wherein each $R^e$ and $R^f$ group is independently selected from the group consisting of linear or branched $(C_{1-6})$alkyl groups; and $R^b$ and $R^c$ are independently selected from the group consisting of $(C_{1-4})$alkyl groups.

Preferred groups for $R^a$ include those selected from the group consisting of a linear or branched $(C_{1-6})$alkyl group and a linear or branched $(C_{2-6})$alkenyl group, particularly a $(C_{1-2})$alkyl group or a $(C_{2-3})$alkenyl group, and more particularly a methyl group or a vinyl group. Preferably, $R^a$ is not substituted.

In the case where $R^a$ is a $(C_{6-10})$aryl group, preferred groups include phenyl and naphthyl groups.

In the case where $R^a$ is substituted, example groups include fluoro-substituted linear or branched $(C_{1-6})$alkyl groups, for example trifluoropropyl groups; cyano-substituted linear or branched $(C_{1-6})$alkyl groups, for example cyanopropyl groups; and amino-substituted linear or branched $(C_{1-6})$alkyl groups, for example aminopropyl groups.

Preferred groups for $R^b$ and $R^c$ include those independently selected from the group consisting of methyl, ethyl, n-propyl and iso-propyl groups. Advantageously, both $R^b$ and $R^c$ are methyl groups.

It is preferred that at least 50% of the terminal groups present in the base polymer be end-capped by a di-$(C_{1-4})$ alkoxy silyl group in the end-capped base polymer, more preferably at least 75%, at least 80%, at least 85%, at least 90%, or at least 95%. Advantageously, substantially all of the terminal groups present in the base polymer are end capped by a di-($C_{1-4}$)alkoxy silyl group in the end-capped base polymer, most preferably by a dimethoxy silyl group.

Where the base polymer is a hydroxy-terminated polysiloxane or mixture of hydroxy-terminated polysiloxanes, then the end-capped base polymer is advantageously the reaction product of the hydroxy-terminated polysiloxane or mixture of hydroxy-terminated polysiloxanes and an end-capping reagent comprising a tri-($C_{1-4}$)alkoxy silane.

The tri-($C_{1-4}$)alkoxy silane for use as an end-capping reagent (crosslinker) may have the following general formula:

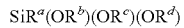

$$SiR^a(OR^b)(OR^c)(OR^d)$$

wherein:
$R^a$, $R^b$ and $R^c$ are as defined previously; and
$R^d$ is a $C_{(1-4)}$alkyl group.

In the same way as for $R^b$ and $R^c$, preferred groups for $R^d$ are selected from the group consisting of methyl, ethyl, n-propyl and iso-propyl groups. Advantageously, all of $R^b$, $R^c$ and $R^d$ are methyl groups.

Preferred examples of the tri-($C_{1-4}$)alkoxy silane are selected from the group consisting of trimethoxyvinylsilane, trimethoxymethyl silane, and mixtures thereof.

The end-capping reagent (crosslinker) preferably comprises at least 50% of tri-($C_{1-4}$)alkoxy silane, more preferably at least 75%, at least 80%, at least 85%, at least 90%, or at least 95%. Alternatively, the end-capping reagent (crosslinker) may consist of tri-($C_{1-4}$)alkoxy silane.

The amount of end-capping reagent used is preferably from 1.0 to 3.0 parts by weight for each 100 parts by weight of base polymer, for example 1.1, 1.2, 1.3, 1.5, 1.6, 1.7, 1.8, 1.9, 2.0, 2.1, 2.2, 2.3, 2.4, 2.5, 2.6, 2.7, 2.8, 2.9 or 3.0 parts by weight for each 100 parts by weight of base polymer.

The composition of the present invention comprises a curing catalyst consisting of one or more selected from the group consisting of organic titanates and organic zirconates. No other curing catalyst is required in the composition.

The organic titanates and organic zirconates for use as curing catalyst in the present invention may be selected from the group of organic titanates and organic zirconates represented by the following general formula:

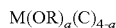

$$M(OR)_a(C)_{4-a}$$

wherein:
M is Ti or Zr;
each R may be the same or different and represents a linear or branched $C_{(1-12)}$alkyl group;
each C may be the same or different and represents a ligand having the following general formula:

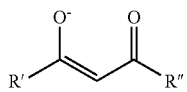

wherein R' and R" are independently selected from the group consisting of a linear or branched ($C_{1-6}$)alkyl group and a linear or branched ($C_{1-6}$)alkoxy group; and
a is an integer from 0 to 4.

Preferred curing catalysts for use in the present invention are organic titanates, such as catalysts of the above general formula in which M is Ti.

Each R group of the curing catalyst may, for example, be the same or different and selected from the group consisting of linear or branched ($C_{3-10}$)alkyl groups, particularly ($C_{3-8}$)alkyl groups. Examples include isobutyl, isopropyl and 2-ethyl hexyl groups.

Preferred groups for R' and R" include those independently selected from the group consisting of a linear or branched ($C_{1-3}$)alkyl group and a linear or branched ($C_{1-3}$) alkoxy group. Examples include a methyl group, an ethyl group, a methoxy group and an ethoxy group, and methyl and ethoxy groups are examples of preferred groups.

Examples of curing catalysts for use in the present invention are those according to the above general formula in which a is 0, 2 or 4. Examples of preferred curing catalysts are those according to the above general formula in which a is 2.

Examples of specific curing catalysts that may be contemplated for use in the present invention are those selected from the group consisting of diisobutoxy-bis(ethylacetoacetato)titanate (CAS: 83877-91-2), titanium diisobutoxide bis(acetylacetonate) (CAS: 17927-72-9), titanium diisopropoxide bis(acetylacetonate), titanium diisopropoxide bis (ethylacetoacetate) (CAS: 27858-32-8), zirconium dibutoxide bis(acetylacetonate) and mixtures thereof.

The curing catalyst may be used in an amount of from 1 to 3.5 parts by weight for each 100 parts by weight of base polymer, for example 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4 or 3.5 parts by weight for each 100 parts by weight of base polymer.

The composition of the present invention comprises at least one amorphous filler.

The amorphous filler for use in the composition of the present invention preferably has a high surface area, for example a B.E.T. surface area of at least 60 m²/g, for example at least 65 m²/g, at least 70 m²/g, at least 75 m²/g, at least 80 m²/g, at least 85 m²/g, at least 90 m²/g, at least 95 m²/g or at least 100 m²/g. The amorphous filler may have a B.E.T. surface area of up to 450 m²/g, for example up to 400 m²/g, up to 350 m²/g, up to 300 m²/g, up to 250 m²/g, up to 200 m²/g, up to 175 m²/g or up to 150 m²/g.

Example amorphous fillers for use in the present invention may have a B.E.T. surface area of from 60 to 450 m²/g, for example from 80 to 150 m²/g, including all intermediate values.

Amorphous fillers that may be contemplated for use in the present invention include those selected from the group consisting of fumed silica, fumed alumina, carbon black, precipitated silica, precipitated calcium carbonate, titanium dioxide and mixtures thereof. For example, the at least one amorphous filler may be a silica or calcium carbonate; preferably, the at least one amorphous filler is selected from fumed silica, precipitated silica and precipitated calcium carbonate; and most preferably, the at least one amorphous filler is fumed silica, for example hydrophobic fumed silica.

The amorphous filler for use in the composition of the present invention may be surface treated. For example, the amorphous filler may be surface treated to make it hydrophobic. Such surface-treated amorphous fillers are well known in the art and commercially available.

Hydrophobic fumed silica is particularly suitable for use in the composition of the present invention, for example silica that has been treated with, for example, a dimethyl silicone fluid (i.e. dimethylsiloxane), dichlorodimethylsilane, hexamethyldisilazane, octamethylcyclopolysiloxane (e.g. octamethylcyclotetrasiloxane) or the like.

The amount of amorphous filler in the composition according to the present invention is from 20 to 55 parts by weight for each 100 parts by weight of base polymer, for example 24 parts, 28 parts, 32 parts, 35 parts, 38 parts, 40 parts, 42 parts, 45 parts, 48 parts, 50 parts or 52 parts by weight for each 100 parts by weight of base polymer, as well as all intermediate values. For example, the composition may comprise from 27 to 49 parts by weight or from 32 to 44 parts by weight of the amorphous filler for each 100 parts by weight of base polymer.

The composition of the present invention also includes at least one spherical filler. Spherical fillers are understood to be particulate materials having an aspect ratio (ratio of length to diameter) of from 0.8 to 1.2, preferably from 0.9 to 1.1, more preferably from 0.95 to 1.05, in particular from 0.98 to 1,02. Ideally, their aspect ratio is 1.

Advantageously, the spherical filler is formed of a glass. Examples of suitable glasses include silicate glasses such as glasses comprising aluminium silicate. Volcanic glasses such as perlite may be a particularly suitable basis for the spherical filler material.

The spherical filler preferably has an average particle size (D50) in the range of from 5 to 50 μm, for example from 8 to 45 μm. The mean true density of the at least one spherical filler may be in the range of from 0.15 to 0.35 $g/cm^3$, for example from 0.20 to 0.30 $g/cm^3$.

The composition according to the invention may comprise further fillers. For example, the composition may comprise at least one further particulate filler that preferably has an average particle size (D50) of at least 5 μm, for example from 5 μm to 35 μm (wherein D50 is the particle size at which 50% by volume of the total volume of particles has a smaller particle size and 50% by volume of the total volume of particles has a larger particle size, measured, for example, by sieving).

The B.E.T. surface area of the at least one further particulate filler is preferably less than 40 $m^2/g$, for example less than 35 $m^2/g$, less than 30 $m^2/g$, less than 25 $m^2/g$, less than 20 $m^2/g$ or less than 15 $m^2/g$.

Examples of further particulate fillers that may be contemplated for use in the compositions according to the present invention include one or more selected from the group consisting of calcium carbonate (such as dry ground grades of calcium carbonate, wet ground grades of calcium carbonate, beneficiated grades of calcium carbonate, precipitated grades of calcium carbonate, surface-treated grades of calcium carbonate); kaolin and other clay-based minerals (such as water fractionated clays, air floated clays, delaminated clays, calcined clays, surface-treated clays, bentonite, slate flour, dolomite); talc (such as dry ground talc, beneficiated ground talc, calcined talc, surface-treated talc); quartz and silica, including natural silicas (such as fused silica, microcrystalline silica, microcrystalline novaculite, diatomaceous silica, perlite) or synthetic silicas (such as fumed silica, precipitated silicas); mica (including ground grades of mica, white grades of mica, surface-modified grades of mica, metal-coated mica grades, vermiculite); pumice; metal oxides and other compounds (such as titanium dioxide, iron oxide, alumina trihydrate, wollastonite, barium sulfate, barium titanate, antimony oxide, magnesium hydroxide, calcium sulfate, anhydrous calcium sulfate, dihydrate calcium sulfate, feldspar, nepheline syenite, zinc oxide); synthetic silicates (such as aluminium silicate, mullite, sillimanite, cyanite, andalusite, synthetic alkali metal aluminosilicates, calcium silicate, magnesium silicate, zirconium silicate); pyrophyllite, sepiolite, zeolites, zinc sulphide, boron nitride, aluminium borate whiskers, graphite; organic fillers (such as cork fillers, corn cob fillers, nutshell flour fillers, rice hull fillers, soybean fillers, starch fillers, wheat flour, wood flour); glass, metals (such as nickel, cobalt) and any non-elastomeric solid polymer.

Preferred fillers for use as the at least one further particulate filler in the composition according to the present invention include those selected from the group consisting of talc, calcium carbonate, calcium silicate, mica, barium sulfate, precipitated silica, and mixtures thereof.

In an embodiment, the composition according to the present invention comprises at least one filler having a needle-like structure, i.e. comprising needle-like particles. The at least one filler having a needle-like structure is preferably characterized by an average particle length (L50) of at least 5 μm (wherein L50 is the particle length at which 50% by volume of the total volume of particles has a shorter particle length and 50% by volume of the total volume of particles has a longer particle length, measured by image analysis) and a mean aspect ratio (i.e. ratio of length to diameter) of at least 3.

The average particle length (L50) of the at least one filler having a needle-like structure is preferably at least 5 μm, for example from 5 μm to 90 μm, for example 5, 10, 15, 20, 25, 30, 35, 40, 45, 50, 55, 60, 65, 70, 75, 80, 85 or 90 μm, including all intermediate values. Preferably, the average particle length (L50) of the at least one filler having a needle-like structure is from 10 μm to 30 μm, for example 10, 11, 12, 13, 14, 15, 16, 17, 18, 19, 20, 21, 22, 23, 24, 25, 26, 27, 28, 29 or 30 μm.

The mean aspect ratio of the at least one filler having a needle-like structure is preferably at least 3, for example from 3 to 30, for example 3, 6, 9, 12, 15, 18, 21, 24, 27 or 30, including all intermediate values. Preferably, the mean aspect ratio of the at least one filler having a needle-like structure is from 3 to 20, for example 3, 4, 5, 6, 7, 8, 9, 10, 11, 12, 13, 14, 15, 16, 17, 18, 19 or 20. The mean aspect ratio may be, for example, from 4 to 15.

The at least one filler having a needle-like structure is preferably an inorganic mineral filler. Preferred examples include wollastonite, aluminium borate and mixtures thereof.

When the at least one further particulate filler comprises at least one filler having a needle-like structure, it is preferred that the at least one filler having a needle-like structure be present in an amount of from about 5% to about 30% by weight based on the total weight of the composition, for example 7, 10, 12, 15, 18, 20, 22, 24, 26, 28 or 29% by weight based on the total weight of the composition, including all intermediate values. Preferably, the at least one filler having a needle-like structure is present in an amount of from about 10% to about 25% by weight based on the total weight of the composition.

Advantageously, the at least one further particulate filler may be a combination of at least one granular filler having an average particle size (D50) of at least 5 μm (for example from 5 to 35 μm) and at least one filler having a needle-like structure, for example wollastonite. For example, the at least one further particulate filler may comprise at least one granular filler having an average particle size (D50) of at least 5 μm (for example from 5 to 35 μm).

Advantageously, the at least one further particulate filler may be a combination of at least one further particulate filler selected from the group consisting of talc, calcium carbonate, calcium silicate, mica, barium sulfate, precipitated silica, and mixtures thereof (and having, for example, an average particle size (D50) of at least 5 μm, for example in the range of from 5 to 35 μm) and at least one filler having a needle-like structure, for example wollastonite.

The composition according to the present invention may additionally comprise an adhesion promoter. The amount of adhesion promoter may be up to 2 parts by weight for each 100 parts by weight of base polymer, for example from 0.4 to 1.6 parts, for example 0.4, 0.5, 0.6, 0.7, 0.8, 0.9, 1.0, 1.1, 1.2, 1.3, 1.4, 1.5 or 1.6 parts by weight for each 100 parts by weight of base polymer, including all intermediate values.

The compositions according to the present invention advantageously have adhesive properties, even in the absence of an adhesion promoter. Nevertheless, the inclusion of an adhesion promoter advantageously promotes lasting adhesion of the compositions according to the present invention to a wide range of substrates including ceramics, glass, metal, wood, plastics and fabrics. It is an advantageous feature of the present invention that such an adhesion promoter can be included while maintaining low tackiness to human skin when the uncured composition is being hand-moulded.

The adhesion promoter for use in the present invention may be selected from suitable adhesion promoters known to those skilled in the art. For example, the adhesion promoter may be an alkoxysilyl compound having one or more substituents selected from the group consisting of amino groups, an epoxy group, aryl groups, a cyano group and an acryloyl group. Mixtures of more than one adhesion promoter may also be contemplated.

The adhesion promoter for use in the present invention may advantageously be one or more selected from the group of compounds having the following general formula:

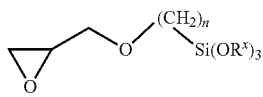

wherein:
n is an integer from 2 to 10; and
$R^x$ is a linear or branched $(C_{1-6})$alkyl group.

Preferred adhesion promoters for use in the composition according to the present invention include those in which n is 3 or 8 and $R^x$ is an ethyl group.

The composition according to the present invention may additionally comprise at least one stabilizer. The at least one stabilizer advantageously acts as a moisture scavenger and thereby improves storage stability. By "moisture scavenger" it is meant a material that reacts with moisture and/or traps moisture.

Materials suitable for use as the at least one stabilizer of the present invention include tri-$(C_{2-4})$alkoxy silanes of the type already described herein for use as end-capping reagents (crosslinkers). The description of those tri-$(C_{2-4})$alkoxy silanes applies mutatis mutandis to the at least one stabilizer of the present invention. In this regard, it is noted that the at least one stabilizer can be the same as the end-capping reagent, or it may be different. In the case where it is the same, then an excess of end-capping reagent (crosslinker) may be used for the end-capping/crosslinking, and the remaining amount may act as a stabilizer; alternatively, an additional amount may be added after end-capping (crosslinking). In the case where it is different, the at least one stabilizer is advantageously added to the composition after end-capping.

Other materials for use as the at least one stabilizer include suitable moisture scavengers known to those skilled in the art, including both organic and inorganic moisture scavengers. Organic moisture scavengers may include those having amido, amino and/or epoxy groups. An example of an organic moisture scavenger is bistrimethylsilyl carbodiimide. As inorganic moisture scavengers, moisture trapping materials such as zeolites may be contemplated.

The composition may contain from 1.5 to 3.5 parts by weight of the at least one stabilizer for each 100 parts of base polymer, for example 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, or 3.5 parts by weight for each 100 parts of base polymer.

The composition according to the present invention may additionally comprise at least one fibrous filler (i.e. a filler composed of fibers). By "fibrous" it is meant a material composed of flexible threads or filaments, typically of a natural or synthetic organic polymer. These threads or filaments may be characterized by an average aspect ratio (i.e. ratio of length to diameter) of, for example, greater than 15, preferably greater than 20. The average length of the threads or filaments may be, for example, less than 1 mm (measured by image analysis). For example, the average length of the threads or filaments may be from about 75 μm to about 500 μm.

Compositions of the present invention including at least one fibrous filler may advantageously exhibit certain modified post-cure characteristics, such as a higher modulus, higher tensile strength, and/or higher tear strength.

The composition of the present invention may include one or more additives selected from the group consisting of colorants (for example dyes and/or pigments, particularly powdered pigments), fragrances, anti-microbial agents, anti-bacterial agents and anti-fungal agents. Other types of additives may also be contemplated in order to impart desired or aesthetic characteristics on the composition of the present invention, as long as they can be accommodated while maintaining the desired properties of the composition.

It will be noted that the curing catalyst of the present invention consists of one or more selected from the group consisting of organic titanates and organic zirconates. Preferably, no carboxylic acid or carboxylic acid anhydride is added to the composition of the present invention.

According to a further aspect, the present invention provides a tin-free, room temperature curable silicone elastomer composition, wherein the uncured composition is a putty and comprises the following components:
  a) An end-capped base polymer, wherein the base polymer comprises a polysiloxane or mixture of polysiloxanes and has a viscosity of at least 80,000 mPa·s at 25° C., and wherein the end-capped base polymer comprises terminal di-$(C_{1-4})$alkoxy silyl groups;
  b) 20 to 45 parts by weight of at least one amorphous filler for each 100 parts by weight of base polymer;
  c) 18 to 58 parts by weight of at least one spherical filler for each 100 parts by weight of base polymer; and
  d) a curing catalyst consisting of one or more selected from the group consisting of organic titanates and organic zirconates.

The description of the first aspect of the invention applies mutatis mutandis to this further aspect.

According to a further aspect, the present invention provides a tin-free, room temperature curable silicone elastomer composition, wherein the uncured composition is a putty and comprises the following components:
  a) An end-capped base polymer, wherein the base polymer comprises a polysiloxane or mixture of polysiloxanes and has a viscosity of at least 80,000 mPa·s at 25° C., and wherein the end-capped base polymer comprises terminal di-$(C_{2-4})$alkoxy silyl groups;
  b) 20 to 45 parts by weight of at least one amorphous filler for each 100 parts by weight of base polymer;
  c) 18 to 58 parts by weight of at least one spherical filler for each 100 parts by weight of base polymer;

d) a curing catalyst consisting of one or more selected from the group consisting of organic titanates and organic zirconates; and e) 25 to 50 parts by weight of at least one filler having a needle-like structure for each 100 parts by weight of base polymer.

The description of the first aspect of the invention applies mutatis mutandis to this further aspect.

Since the composition of the present invention is of the condensation curing type and begins to cure when exposed to moisture, it is advantageously packaged in a sealed packaging that acts as a moisture barrier. Thus, according to a further aspect of the present invention, there is provided a packaged silicone elastomer composition comprising the composition according to the present invention in its uncured state within a sealed packaging, wherein the sealed packaging has a water vapour transmission rate (WVTR, DIN 53122, 38° C., 98% rh) of less than 1 g/m$^2$/day, preferably less than 0.5 g/m$^2$/day, and more preferably less than 0.1 g/m$^2$/day.

According to a further aspect, the present invention provides a method of producing a cured silicone elastomer composition comprising exposing the composition according to the present invention in its uncured state to moisture (e.g. the moisture naturally present in the air). It is an advantageous feature of the present invention that, from the point at which the uncured composition is exposed to moisture (e.g. in the air), the composition remains workable (e.g. hand-mouldable) for a period of up to about 1 hour, for example up to 50 minutes or up to 35 minutes.

According to a further aspect, the present invention provides the silicone elastomer composition according to the present invention in its cured state. The silicone elastomer composition of the present invention in its cured state is resilient and tough. In particular, the cured composition has high tensile strength and elongation at break. The cured compositions are also able to retain excellent adhesion to a wide range of substrates.

The silicone elastomer composition according to the present invention may be prepared in accordance with methods generally known in the field of silicone elastomers. For example, the silicone elastomer composition may be prepared by carrying out the following steps:

a) End-capping the base polymer by carrying out a reaction between the base polymer and an end-capping reagent. This reaction may be carried out in the presence of a functionalization catalyst. Suitable functionalization catalysts include strong bases such as alkali metal hydroxides (such as lithium hydroxide, sodium hydroxide, potassium hydroxide, rubidium hydroxide and caesium hydroxide) and alkali metal silanolates (such as alkali metal trimethylsilanolates, for example sodium trimethylsilanolate and potassium trimethylsilanolate), as well as mixtures of any of these. The functionalization catalyst may be diluted in a suitable solvent as required before use, for example an alcohol (such as ethanol). Following the end-capping reaction, the functionalization catalyst can be neutralized using a suitable acidic neutralization agent;

b) Combining the end-capped base polymer with the remaining components in a low-moisture, preferably substantially moisture-free, environment and mixing until homogeneous; and c) Removing volatile components, e.g. under vacuum.

Those skilled in the art will recognise that the above procedure may be modified in a number of ways. For example, step (c) may be carried out prior to, or during, step (b). Furthermore, the remaining components added in step (b) may be added separately or as pre-prepared mixtures, together or in any suitable order. Moreover, components other than the curing catalyst may be added prior to transferring the mixture to a low-moisture, preferably substantially moisture-free, environment, if desired.

The compositions of the present invention are generally prepared at ambient temperatures, for example at a temperature of from about 15° C. to about 35° C.

After preparation, the compositions of the present invention are stored in a low-moisture, preferably substantially moisture-free environment, until required. For example, they may be packaged in a packaging of the type described above.

The invention will now be illustrated by means of the following examples, it being understood that these are intended to explain the invention, and in no way to limit its scope.

EXAMPLES

Compositions were prepared according to the following Examples:

Example 1

100 parts by weight of a hydroxy-terminated polydimethylsiloxane having a viscosity of 180,000 mPa·s at 25° C. was functionalized with 1.20 parts vinyltrimethoxysilane to give an end-capped polysiloxane having terminal vinyldimethoxysilyl groups. This was mixed with 37.83 parts poly(dimethylsiloxane)-treated fumed silica (Cabosil™ TS720, amorphous), 21.40 parts of hollow glass spheres (3M™ glass bubbles iM16K), 43.02 parts needle-shaped calcium silicate (Tremin™ 939-600), 1.68 parts 3-glycidyloxypropyltriethoxysilane (GLYEO), 2.12 parts diisobutoxy-bisethylacetoacetatotitanate, 2.10 parts methyltriethoxysilane (MTES) and 2.10 parts brown pigment (Holcosil™) to produce a colored putty-like product Sample 1.

Example 2

100 parts by weight of a hydroxy-terminated polydimethylsiloxane having a viscosity of 180,000 mPa·s at 25° C. was functionalized with 1.20 parts vinyltrimethoxysilane to give an end-capped polysiloxane having terminal vinyldimethoxysilyl groups. This was mixed with 13.98 parts poly(dimethylsiloxane)-treated fumed silica (Cabosil™ TS720, amorphous), 55.64 parts of glass spheres (3M™ glass bubbles iM16K), 27.96 parts needle-shaped calcium silicate (Tremin™ 939-600), 27.96 parts calcium carbonate (Winnofil™ SPM, amorphous), 0.94 parts 3-glycidyloxypropyltriethoxysilane (GLYEO), 2.33 parts diisobutoxy-bisethylacetoacetatotitanate, 2.33 parts methyltriethoxysilane (MTES) and 2.31 parts blue pigment (Holcosil™) to produce a colored putty-like product Sample 2.

Comparative Example 3

100 parts by weight of a hydroxy-terminated polydimethylsiloxane having a viscosity of 300 000 mPa·s at 25° C. was functionalized with 2.58 parts vinyltriethoxysilane to give an end-capped polysiloxane having terminal vinyldiethoxysilyl groups. This was mixed with 15.80 parts poly(dimethylsiloxane)-treated fumed silica (Cabosil™ TS720, amorphous), 59.18 parts of talc (Magsil™ D200, platelets), 10.98 parts aluminium silicate (Sil-Cell™, amorphous-spherical), 61.75 parts of needle-shaped calcium silicate (Tremin™ 939-600), 1.06 parts 3-glycidyloxypropyltriethoxysilane (GLYEO), 2.04 parts diisobutoxy-bisethylacetoacetatotitanate, 2.58 parts methyltriethoxysilane (MTES) and 1.29 parts black HTV pigment (Holcosil™) to produce a colored putty-like product Sample 3.

Comparative Example 4

100 parts by weight of a hydroxy-terminated polydimethylsiloxane having a viscosity of 300 000 mPa·s at 25° C. was functionalized with 1.19 parts vinyltrimethoxysilane to give an end-capped polysiloxane having terminal vinyldimethoxysilyl groups. This was mixed with 15.67 parts poly(dimethylsiloxane)-treated fumed silica (Cabosil™ TS720, amorphous), 58.35 parts of talc (Magsil™ D200, platelets), 10.91 parts aluminium silicate (Sil-Cell™, amorphous-spherical), 60.91 parts of needle-shaped calcium silicate (Tremin™ 939-600), 1.01 parts 3-glycidyloxypropyltriethoxysilane (GLYEO), 2.03 parts diisobutoxy-bisethylacetoacetatotitanate, 2.56 parts methyltriethoxysilane (MTES) and 0.51 parts blue pigment (Holcosil™) to produce a colored putty-like product Sample 4.

Test Methods

The following test methods were carried out:

Tensile Strength Test

The tensile test was carried out as follows on samples cured for 24 hours and 48 hours, respectively, at 25° C. and 50% relative humidity (HR):
Test pieces (1 cm×7 cm pieces cut from cured 2 mm thick sheets of the material) were stretched using a universal testing machine (UTM) at a constant velocity of 500 mm/min crosshead of the driven grip. Readings of tensile strength were taken during the stretching of the test piece until it broke.

Williams Plasticity

Williams Plasticity is a commonly used parameter (described in various standards including ASTM-D926, ISO-7323 and JIS-K6249) for the characterization of materials which are too viscous for a reliable viscosity measurement (i.e. they do not flow without applied force). The method used to determine Williams Plasticity was to take 2 cm³ of material, formed into a cylinder of 10 mm in height, and to place this between the parallel plates on a Williams Plastometer instrument. 49 N of force (5 kgf) was then applied to the top plate to deform the sample for 90 seconds. The final gap between the plates was measured in mm to the nearest 0.01 mm and this value was multiplied by 100 to give a 'plasticity number' as an absolute value of between 1 and 1000. This test was carried out at a temperature of 23±2° C.

Highly Accelerated Life Test (HALT)—Stability

In order to compare the stability of compositions, a highly accelerated ageing test was performed in which samples were stored at high temperature (70° C.) for approximately 15 days. Plasticity measurements were taken every day.

Cure Depth Test Method

A metal, non-tapered pin with a flat tip (approximating a solid cylinder) is suspended rigidly from a load cell on a tensile testing machine. This pin is forced at a controlled rate of 10 mm/min through the centre of the uncured circular face of an uncured/partially cured 10 mm thick disk-like specimen of test material, along an axis perpendicular to this circular face, until it emerges from the other side of the disk, which is partially cured. The axial force on the pin is recorded throughout the penetration of the specimen and can be used to assess the extent of curing on the circular face of the specimen that has been exposed to air for 24 hours.

Shelf Life

Samples were stored in air-tight packaging in an oven at 55° C. for the duration as given in FIG. 1. After storage, tensile strength was measured according to the method set forth above. Results are given in FIG. 1.

TABLE 1

| | Examples: (Sample Number) | | Comparative Examples: (Sample Number) | |
|---|---|---|---|---|
| | 1 | 2 | 3 | 4 |
| Williams Plasticity Number fresh after mixing | 301 | 220 | 235 | 192 |
| Tensile Strength (MPa) (24 h cure) | 3.48 | 3.50 | 3.00 | 3.62 |
| Tensile Strength (MPa) (48 h cure) | 4.70 | 3.95 | 3.30 | 4.15 |
| Cure depth after 24 hours (mm) | 3.58 | 2.46 | 1.3 | 1.89 |
| Cure perception after 24 hours (N) - load at maximum load | 2.93 | 3.51 | 2.30 | 2.86 |
| Qualitative uncured material | All samples were smooth putties, easy to mould | | | |

All samples were tested after 7 days of being packaged (air-tight).

The invention claimed is:
1. A silicone elastomer composition comprising:
   a) an end-capped base polymer, wherein the base polymer comprises a polysiloxane or mixture of polysiloxanes, and wherein the end-capped base polymer comprises terminal di-($C_{1-4}$)alkoxy silyl groups;
   b) at least one amorphous filler;
   c) 20 to 60 parts by weight of at least one spherical filler for each 100 parts by weight of base polymer; and
   d) a curing catalyst consisting of one or more selected from the group consisting of organic titanates and organic zirconates;
   wherein, the composition is (i) tin-free, (ii) a putty in an uncured state, and (iii) curable at room temperature.
2. The composition of claim 1, wherein the composition is a one-part silicone elastomer composition.
3. The composition of claim 1, wherein the at least one amorphous filler is selected from the group consisting of fumed silica, fumed alumina, carbon black, precipitated silica, precipitated calcium carbonate, surface-treated calcium carbonate and mixtures thereof.
4. The composition of claim 1, wherein the at least one amorphous filler is fumed silica.
5. The composition of claim 1, wherein the at least one spherical filler is selected from the group consisting of calcium silicate, titanium dioxide, glass bubbles, polymeric bubbles, ceramic bubbles, and mixtures thereof.
6. The composition of claim 1, wherein the at least one spherical filler comprises glass bubbles.

7. The composition of claim 1, wherein the composition further comprises at least one filler having a needle-like structure.

8. The composition of claim 7, wherein the mean aspect ratio of the at least one filler having a needle-like structure is at least 3.

9. The composition of claim 7, wherein the at least one filler having a needle-like structure is an inorganic mineral filler.

10. The composition of claim 7, wherein the at least one filler having a needle-like structure is selected from wollastonite, aluminium borate, and mixtures thereof.

11. The composition of claim 7, wherein the at least one filler having a needle-like structure is present in an amount of from 5% to 30% by weight based on the total weight of the composition.

12. The composition of claim 1, wherein the composition is in its cured state.

13. The silicone elastomer composition of claim 1, wherein the composition, in an uncured state, exhibits a Williams plasticity number within a range of from 100 to 350 at 25° C.

14. The silicone elastomer composition of claim 1, wherein
the base polymer comprises one type or more than one type of monomer of the following general formula:

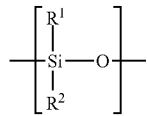

wherein $R^1$ and $R^2$ are independently selected from the group consisting of linear or branched $(C_{1-6})$alkyl groups, linear or branched $(C_{2-6})$alkenyl groups, linear or branched $(C_{2-4})$haloalkyl groups and phenyl groups.

15. The silicone elastomer composition of claim 1, wherein
the terminal di-$(C_{1-4})$alkoxy silyl groups have the general formula:

—SiR$^a$(OR$^b$)(OR$^c$)

wherein $R^a$ is selected from the group consisting of a linear or branched $(C_{1-10})$alkyl group, a linear or branched $(C_{2-8})$alkenyl group and a $(C_{6-10})$aryl group, each of which groups may be optionally substituted by one or more substituents selected from the group consisting of halogens, a cyano group, an aminyl group, an —NHR$^e$ group, an —NR$^e$R$^f$ group, an —OR$^e$ group, a —C(=O)R$^e$ group, a —C(=O)OR$^e$ group, a carboxyl group, a glycidyl group and a sulfanyl group, wherein each R$^e$ and R$^f$ group is independently selected from the group consisting of linear or branched $(C_{1-6})$alkyl groups; and R$^b$ and R$^c$ are independently selected from the group consisting of $(C_{2-4})$alkyl groups.

16. The silicone elastomer composition of claim 1, wherein
the curing catalyst is selected from the group consisting of diisobutoxy-bis(ethylacetoacetato)titanate, titanium diisobutoxide bis(acetylacetonate), titanium diisopropoxide bis(acetylacetonate), titanium diisopropoxide bis(ethylacetoacetate) and zirconium dibutoxide bis(acetylacetonate), and combinations thereof.

17. The silicone elastomer composition of claim 1, wherein
the at least one amorphous filler is present in an amount of from 5% to 40% by weight, based on the total weight of the composition.

18. The silicone elastomer composition of claim 1, wherein
the composition is free of carboxylic acid and carboxylic acid anhydride.

19. The silicone elastomer composition of claim 1, wherein
the composition comprises 21 to 56 parts by weight of the at least one spherical filler for each 100 parts by weight of the base polymer;
wherein, the at least one spherical filler comprises glass bubbles.

20. A silicone elastomer composition comprising:
a) an end-capped base polymer, wherein the base polymer comprises a polysiloxane or mixture of polysiloxanes, and wherein the end-capped base polymer comprises terminal di-methoxy silyl groups;
b) at least one amorphous filler;
c) 15.1 to 60 parts by weight of at least one spherical filler for each 100 parts by weight of base polymer; and
d) a curing catalyst consisting of one or more selected from the group consisting of organic titanates and organic zirconates;
wherein, the composition is (i) tin-free, (ii) a putty in an uncured state, and (iii) curable at room temperature.

* * * * *